United States Patent
Podrovitz (10) Patent No.: US 7,213,777 B2
(45) Date of Patent: May 8, 2007

(54) PUBLIC ACCESS INFORMATION DESTRUCTION SYSTEM PERFORMING PAY-PER-USE SHREDDING

(75) Inventor: Johnny R. Podrovitz, Colorado Springs, CO (US)

(73) Assignee: JRP Enterprises, LLC, Colorado Springs, CO (US)

( * ) Notice: Subject to any disclaimer, the term of this patent is extended or adjusted under 35 U.S.C. 154(b) by 36 days.

(21) Appl. No.: 11/185,266

(22) Filed: Jul. 20, 2005

(65) Prior Publication Data

US 2006/0180686 A1 Aug. 17, 2006

Related U.S. Application Data

(60) Provisional application No. 60/653,416, filed on Feb. 16, 2005.

(51) Int. Cl.
*B02C 23/00* (2006.01)
*B02C 1/08* (2006.01)
*B02B 5/02* (2006.01)

(52) U.S. Cl. .................. 241/37.5; 241/100; 241/236

(58) Field of Classification Search ............. 241/33, 241/100, 236, 295, 37.5, 101.2
See application file for complete search history.

(56) References Cited

U.S. PATENT DOCUMENTS 5,704,558 A * 1/1998 Arrott ................... 241/47
6,079,645 A * 6/2000 Henreckson et al. ....... 241/37.5
2004/0260470 A1* 12/2004 Rast .......................... 701/300

OTHER PUBLICATIONS

U.S. Consumer Product Safety Commission, Dec. 2004.*
Epinions.com Fellowes Manufacturing Poweshred Shredmate Shredder 1999.*

* cited by examiner

*Primary Examiner*—Faye Francis
(74) *Attorney, Agent, or Firm*—Kent A. Lembke; Hogan & Hartson LLP (57) ABSTRACT

A pay-per-use shredding system for public use for destroying documents and media containing private or personal information. The system includes a shredder, a feed chute for receiving material and an outlet feeding the material to the shredder inlet, and a storage bin below the shredder outlet to receive shredded materials. A portal provides a line of sight to the interior of the storage bin for user visual confirmation of destruction. The system further includes a payment receipt mechanism, such as a keypad, a card receptor, or a bill or coin receptor. A controller acts to validate and/or authenticate payment at the receipt mechanism and to determine a shred time period. The controller operates the shredder for the shred time period, such as in response to a start instruction from the user via a start button. A display is decremented to show the remaining shred time to the user.

16 Claims, 3 Drawing Sheets

PUBLIC ACCESS INFORMATION DESTRUCTION SYSTEM PERFORMING PAY-PER-USE SHREDDING

CROSS-REFERENCE TO RELATED APPLICATIONS

This application claims the benefit of U.S. Provisional Applicant No. 60/653,416, filed Feb. 16, 2005, which is incorporated in its entirety herein by reference.

BACKGROUND OF THE INVENTION

1. Field of the Invention

The present invention relates, in general, to shredding systems and devices used to destroy documents and other items, and, more particularly, to a shredding system that is designed for use in a public location, such as grocery store, that allows a user or customer to use the system for a single use based on payment and enables the user to confirm destruction of documents and other items, such as credit cards and the like.

2. Relevant Background

Identity theft is one of the fastest growing crimes in the United States and around the world. Identity theft is the act of impersonating another by means of using the person's information, such as birth date, Social Security number, address, name, and bank account information, and such theft is typically performed to gain access to the victim's credit or other financial accounts. In 2004, more than 9.9 million Americans were the victims of identity theft, e.g., every 10 seconds another American is victimized.

Identity theft can result in serious losses and problems for the victims. For example, it has been estimated that American victims lost a collective $5 billion in 2004. Further, the victim may have their credit rating significantly reduced, which can often be a more serious problem to the individual than the initial financial losses. Recovering from an identity theft can be problematic, too. Estimates have shown that on average an identity theft victim may spend about $1,500 and up to 600 hours getting their finances in order.

Many believe identity theft is a new problem resulting from use of the Internet and other digital communications networks. However, nearly ninety percent of all identity theft incidents occur offline, e.g., not as a result of using the Internet. Identity thieves instead find the victims' information on documents and other media (such as credit cards, computer disks, compact disks (CDs), and the like) that they steal from the victim or otherwise obtain, such as from the victims' trash or mail. For example, an identity thief may go through the victim's garbage, which may include discarded credit card bills, bank statements, and other documents with personal information. The identity thief then uses this information to access the victim's credit, debit, or other financial accounts or otherwise impersonate the victim.

One of the most effective ways to prevent identity theft is shredding old or unwanted documents containing personal and financial information. The U.S. Federal Trade Commission has issued statements recommending that identity theft can be thwarted by shredding your charge receipts, copies of credit applications, insurance forms, physician statements, checks and bank statements, credit offers received in the mail, and expired charge cards. More simply, the National Crime Prevention Council has recommended "Shred, Shred, Shred all documents that have important numbers." Additionally, there are mandates, such as those found in the 2003 Fair and Accurate Credit Transaction Act, for disposing of personal information. For example, this act mandates that if an individual or business hires someone, such as a maid, a gardener, a nanny, or other employee, the employer is required to destroy the employee's personal information including social securing number when forms are completed or no longer needed.

Larger companies have employed shredders for many years, and more recently, smaller models have become available for purchase by individual consumers. However, these home shredders have not been widely adopted by consumers in part due to cost but more due to the fact that these smaller devices are often perceived as being slow, noisy, underpowered, and potentially unsafe. As a result, most people continue to simply throw away their confidential documents with the hope that they will not be the next victim of identity theft. Unfortunately, as noted by the U.S. Consumer Credit Counseling Agency, tearing documents in half and throwing them in the trash is not enough protection against the increasingly prevalent crime of identity theft. If consumers do have a home shredder, large document volumes are difficult and time consuming to process with the underpowered shredding devices.

Hence, there remains a need for a method or system for more effectively allowing the general public to destroy documents and other media that may include personal or financial information or otherwise be the target of perpetrators or identity theft.

SUMMARY OF THE INVENTION

The present invention addresses the above and other problems by providing a public-accessible information destruction or shredding system that is adapted to allow an individual to better deter identity theft by quickly and personally destroying documents and other media containing sensitive or personal information. The system is adapted to be a pay-per-use system that operates for a period of time based upon the amount of payment. Payment can be made and the system activated through a payment receipt mechanism such as a coin/bill acceptor, credit/debit card acceptor, or a keypad that allows entry of an activation code. Each of such payment methods is then verified and the amount of payment converted into a corresponding shredding time or period, which is monitored by a clock or timer with remaining time being displayed to the user or operator of the system. The system includes a cabinet or housing that contains an internally positioned shredder apparatus protected with built-in safety controls. The cabinet includes a feed chute through which documents or media for shredding are fed to the shredding apparatus. The outlet of the shredding apparatus feeds shredded material into a storage bin. To provide the user with visual confirmation of successful shredding, a clear window (or visual confirmation portal) is provided in the cabinet or the storage bin.

Operation generally involves an individual providing payment by inserting currency or a credit/debit card into a corresponding acceptor or receipt device and a signal is sent to an intelligent controller for activation. The intelligent controller acts to validate the payment and to convert the amount of payment to a time of system operation (e.g., a shredding time) based on preset parameters. Payment may also be made via entry of an activation code on a keypad. In this case, the intelligent controller validates the code by comparing the received code to a set of codes in memory. If validated, the code is used to activate the system for a shredding period (such as a 4-minute time period) and usage or billing information is stored in memory for later use in billing the user or an account associated with the activation code. Some embodiments or models will have one of these payment devices, some may have two of these payment devices (in any combination), and some may have all three payment devices.

A start button or switch is provided to allow the user to initiate the shredding time. Documents and/or media for shredding are manually inserted into the feed chute which safely feeds the documents and/or media to the running shredding apparatus (which begins operation based on signals from the intelligent controller). The internal shredding machinery shreds the material and deposits them into the internal storage bin. The shredded material passes in front of the visual confirmation portal or window to allow the user to witness or visually confirm in real time that their items are being shredded. When the purchased shredding time expires as determined by the timer or clock, the internal controller deactivates the system, which is now ready for the next individual's or customer's transaction.

More particularly, in one embodiment, an apparatus is provided for shredding materials in a public facility on a pay-per-use basis. The apparatus includes a shredder, with an inlet and an outlet, that is operable to shred material, such as paper documents and other media, that is fed into the shredder inlet. A controller is provided that selectively operates the shredder, such as by operating the motor. The apparatus also includes a payment receipt mechanism for receiving a payment from a user, which may include bill or coin currency, an activation code, or a credit/debit/bank card. A storage portion or area is provided with a storage bin that is positioned to receive the material fed into and shredded by the shredder that is output via the shredder outlet.

The storage portion or area of the apparatus includes a portal of substantially transparent material providing a line of sight to the inner compartment or storage bin from a location exterior to storage area, which visually exposes at least a portion of the inner compartment of the storage area. The controller operates to determine the validity of the received payment at the payment receipt mechanism and when valid, to run or operate the shredder. The controller may include a shred period calculator that converts the received payment to a shred time period, such as by converting a payment amount to a length of time based on a present conversion factor or parameter. A display device is provided that the controller can operate to display the shred time and other system information, e.g., "Out of Service" and/or the like. The shred time may be adjusted to show the available shred time by the controller based on a measured operating time gathered or determined by a timer that is used to reduce the original shred time.

DETAILED DESCRIPTION OF THE PREFERRED EMBODIMENTS

The invention is directed toward a system, and corresponding methods, for providing pay-per-use shredding services in locations that are accessible or open to the public such as supermarkets and the like. Briefly, the system is configured with a visual confirmation window or viewing portal in or adjacent to a storage bin such that the user can verify that their materials have been effectively destroyed. The system is also adapted to convert payment to a shredding period or time to provide the user with a time of use based on the amount of their payment or in some cases, a fixed charge is set for a predetermined time of operation, e.g., one dollar charge for a time period such as a period in the range of 2 to 6 minutes. In addition to the features of visual confirmation and pay-per-use, the system is designed with one or more safety features to allow the system to be operated without an attendant in a public location. These features include a feed chute with an outlet that has two safety control points for the material to pass through into the inlet of a shredding mechanism to prevent an operator from accidentally inserting their finger or other body part or clothing into the shredder. The system may also be configured to store billing data or shredder usage of individuals that use activation codes to activate the system via a keypad or the like, and such billing data is later provided to an invoicing service.

These and other features of the invention will become clear from the following description with reference to FIGS. 1–4. Generally, however, the systems includes a shredder, a currency/credit card acceptor and/or an activation code key pad (or other input device), and an intelligent controller board. The controller board includes processors, memory, and logic (e.g., the intelligence of the system) to operate and manage or control system activation (e.g., on and off times), activation code storage and validation, credit/debit card validation and/or authentication, full system operation management (e.g., determining when storage bin is full, determining when there are operational problems with the shredding apparatus or other components such as the payment receipt mechanism(s), and the like), and facilitating input/output interfaces such as operation of the keypad and other payment receipt devices, operating a shredding time display, receiving input from stop and/or start switches/buttons. The components are positioned in a housing or cabinet, which includes a storage bin that includes a door for allowing physical access to the bin for emptying the shredded material. The door includes a window that allows a user to visually confirm successful destruction of their input documents and/or media (such as computer disks, compact disks (CDs), digital video disks (DVDs), credit/debit cards, identification cards, and the like).

During operation, upon activation by either direct currency, credit/debit/bank card acceptance, or code authorization, the information destruction system destroys materials through its internal shredding mechanism for a set length of time that has been purchased. Then, the material is deposited into the storage bin. Items to be destroyed are manually fed into the shredder via a feed chute (or slot), with it being important for safety and operation of the shredder that the feed chute or area is configured to accept items of varying sizes but is small enough at its outlet (or inlet to the shredding mechanism) and appropriately distanced from the shredding mechanism to prevent or minimize the risk of injury. In addition to documents, the system is typically adapted with a shredding apparatus that can shred or destroy other items or media that is targeted for identity theft such as credit/debit/bank cards, ID cards, and digital data media such as computer disks, CDs, DVDs, and the like. As will be appreciated, the system will likely be used by consumers for destroying documents such as credit card statements, unwanted pre-approved credit card applications, checks, bank and financial institution statements, credit card receipts, ATM receipts, medical statements, insurance statements, bills, old tax returns, and nearly any other document containing personal information.

Figure 1:
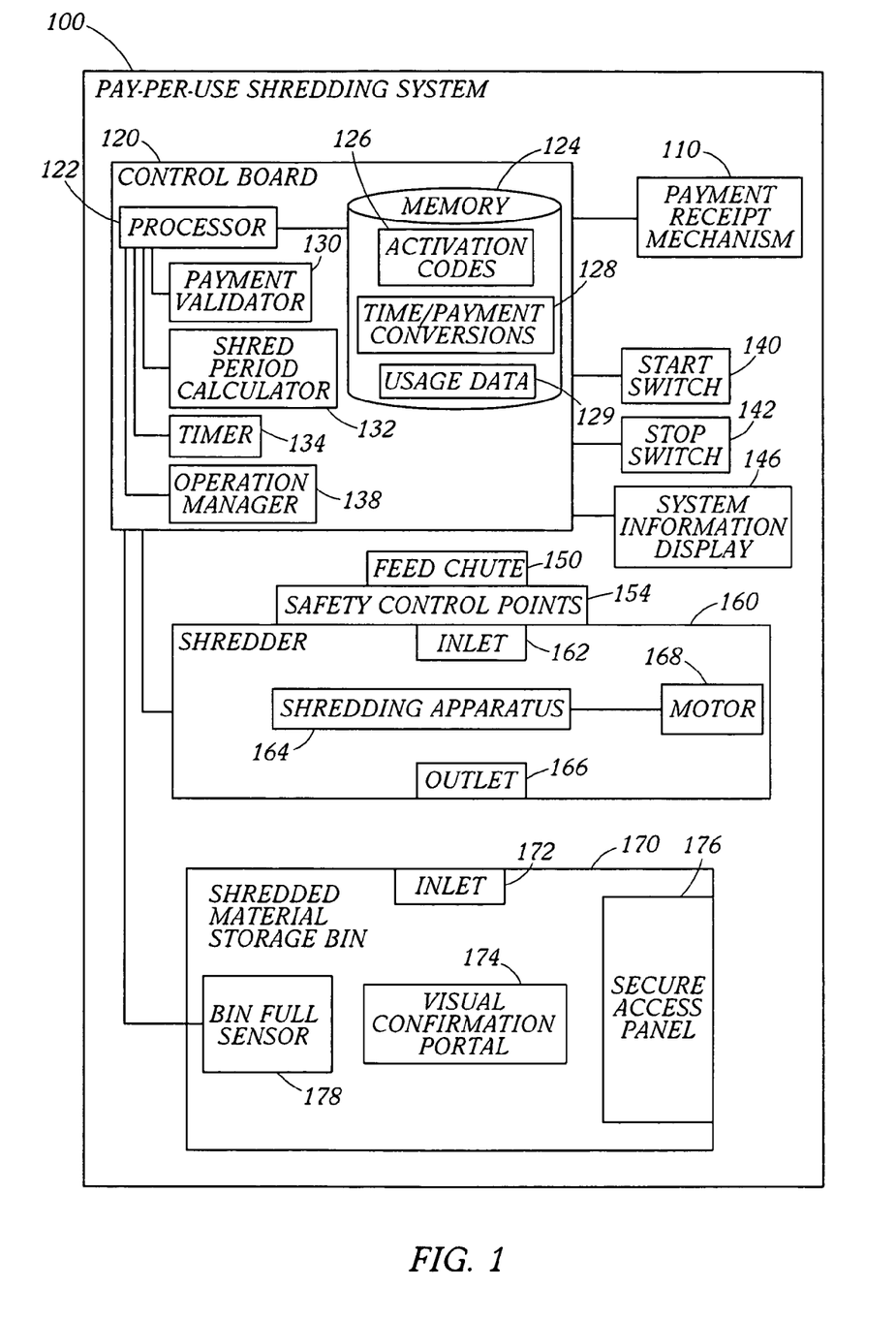
FIG. 1 illustrates in block form a pay-per-use shredding system showing features of such a system in an exemplary embodiment of the invention.

FIG. 1 illustrates in block form an exemplary pay-per-use shredding system 100 according to one embodiment of the invention. As shown the system 100 includes a payment receipt mechanism 110 for allowing a user of the system 100 to input a form of payment. Typically, this mechanism 110 may be a bill or coin receipt device, a credit/debit/bank card acceptor or reader, and/or a keypad or input device to receive as input an activation code from a user. The payment receipt mechanism 110 is communicatively linked (e.g., to send signals indicating receipt of a form of payment) to a control board 120 that functions to provide the intelligence of the system 100.

The control board 120 includes a processor 122 and memory 124 as well as I/O devices (not shown) for communicating with payment receipt mechanism 110 and other components of the system 100 including a start switch 140, a stop switch 142, a system information display 146, a shredder 160, and a bin full sensor 178 in the storage bin 170. The processor or CPU 122 functions to manage operation of the memory 124 including storage and retrieval of activation codes 126 that represent codes for individuals/companies that have accounts established for invoicing of shredding services, time/payment conversions or conversion parameters that are used for converting a payment amount into a shredding period or shredding time (e.g., $1 may be converted into a single shredding time such as 4 minutes or the like), and usage or billing data 129 that tracks usage of the system 100 based on activation codes to allow later billing or invoicing of such users.

The processor 122 also runs logic or software programs that perform various functions within the system 100 to automate much operation of the system 100, such as with the operation manager 138. For example, the board 120 may include a payment validator 130 that processes signals from the payment receipt mechanism 110 to determine if the payment is authentic (such as a bill or coin (although such logic may be provided at the mechanism 110) or to authorize the payment input such as for a credit/debit card or to compare an input activation code against an activation code 126 in memory 124. The payment validator 130 in some embodiments may also act to determine an amount of payment, such as the amount of payment by bill/coin, a charge to a card, or payment input from the keypad. This may be relevant for embodiments where a user can purchase two or more shredding times at once or where the user can purchase variable amounts of time.

Once a payment is validated, the processor 122 may use a shred period calculator 132 to convert the payment amount to a shredding time or activation time period. In some cases, a user can only purchase one time period and in these cases, the conversion is simply a matter of retrieving the time period set in the conversions 128 or preset with timer 134. For example, a shredding time may be selected to last from 2 to 8 minutes, e.g., for 4 minutes, which for many shredding apparatus 164 would provide the capacity to shred 4 pounds of paper or about 400 sheets of 8½×11, 20-pound of paper. The determined shredding time is then displayed on the system information display 146 by the operation manager 138 and the timer set or reset (as appropriate) to start a new timing cycle. The user can then operate the start switch 140 to cause the operation manager 138 to start the shredder 160 and timer 134. The user can then input documents or other materials for shredding in the feed chute 150. To interrupt shredding or after completion of a job, the user can operate stop switch 142 to signal the operation manager 138 to deactivate the shredder 160 and stop timer 134 (to zero the displayed time as the stop switch 142 results in ending a pay-per-use session of system 100). In other embodiments, the shred period calculator 132 applies a time/payment conversion 128 to the determined payment amount to determine a shredding time or activation period. For example, a payment of $2 may be received and conversion may result in a determination that this is a payment of a fixed number of minutes or of a fixed number of shredding periods (e.g., each being 4 minutes long). This shredding time is then passed to the operation manager 138 for display on the system information display 146 and passed to the timer 134. The operation manager 138 then activates the shredder 160 (such as by operating motor 168) upon receipt of a start signal from start switch 140.

The shredding system 100 also includes a feed chute 150, a set of safety controls 154, a shredder 160, and a shredded material storage bin 170. The feed chute 150 exposes a feed inlet to the user for feeding or inputting documents or media for shredding and an outlet that directs the materials to an inlet 162 of the shredder 160 via the safety control points 154 (which may include a particular shape and size of the feed chute outlet and distancing from the shredder inlet 162 to make it difficult or impossible for a user to insert a finger or other part of their body into the shredder 160). The shredder 160 includes an inlet 162 that directs input material to a shredding apparatus 164 run or operated by motor 168.

The shredded material is then passed through the shredder output 166 to an inlet 172 of the storage bin 170. A visual confirmation portal or window 174 (e.g., transparent or substantially transparent glass, plastic, or other material) is provided so that users can verify or know that the material they input through the feed chute 150 was actually destroyed or shredded and such confirmation is obtained in real time. A secure access panel 176 is provided in the storage bin 170 to provide maintenance personnel with a way of accessing the storage bin 170 to remove shredded material. In this regard, a bin full sensor 178 is provided in the system 100 for sensing when the storage bin 170 is full or will soon be full and/or require emptying. Such a sensor 178 may be a visual sensor, a weight-based sensor, or the like that transmits a signal to the operation manager 138 on the control board 120, which can respond by transmitting a maintenance signal to a remote location indicating service is required and in some cases, preventing additional operation of the system 100 (with a corresponding display such as on time display 146 indicating that the system 100 is temporarily out of service). The operation manager 138 may also sense other operational problems (such as loss of power, system jam, and/or the like), report such problems to remote locations, and/or terminate operation of system 100 by users (at least temporarily).

Figure 2:
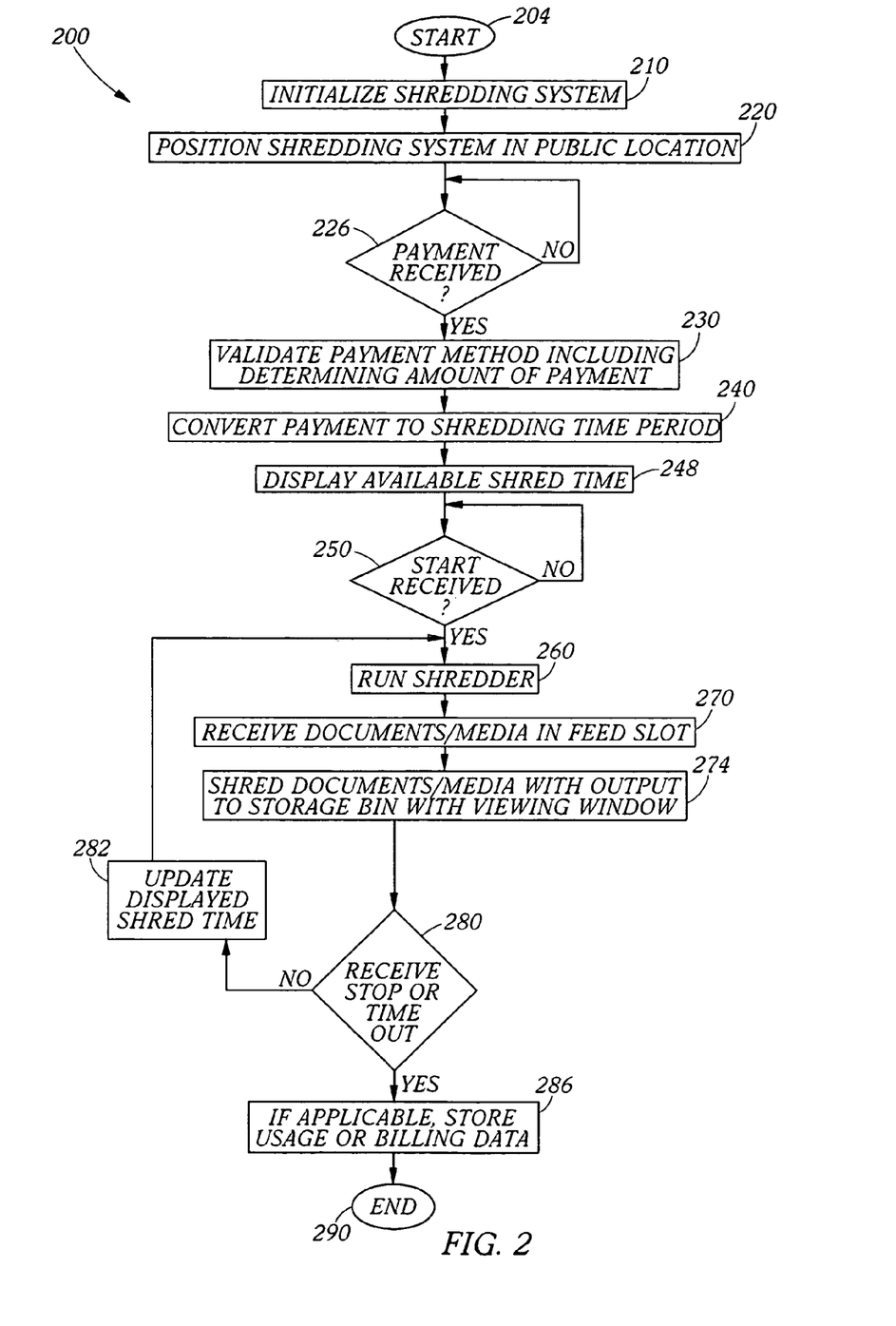
FIG. 2 illustrates steps involved in the operation of a shredding system, such as that shown in FIGS. 1, 3, and 4, according to an embodiment of the invention.

FIG. 2 illustrates exemplary, but not limiting, operation 200 of a shredding system according to one embodiment of the invention. The operation 200 begins at 204 such as with configuring a system, such as the system 100 of FIG. 1, with logic for providing the desired functionality of the system. At 210, the shredding system 210 is initialized such as by storing activation codes 126 and time/payment conversion parameters 128 in memory 124. At 220, the shredding system 100 is positioned in a location for access by users or customers, e.g., a public facility such as a grocery store, a library, or the like. At 226, the method 200 continues with determining whether payment is received and if not, the system 100 continues to wait for payment at 226.

When payment is received by payment receipt mechanism 110, the method 200 continues at 230 with validating the payment form or method including determination of the amount or size of payment. Step 230 may include determining whether a coin or bill received is authenticate and its denomination(s), determining whether a credit/debit/bank card is authenticate and/or whether payment is authorized (such as is performed by well-known ATM and/or credit/debit card authorization devices), and/or determining whether an activation code entered via a keypad or other device matches a stored code 126 in the system memory 120. At 240, the method 200 continues with converting the payment into a shredding time period, which may involve simply retrieving a value for a time period (such as 4 minutes or some other useful time period) or may involve multiplying the payment amount by a shredding time conversion parameter wit the shred period calculator 132.

At 248, the determined shred time from 240 is displayed on time display 146 (or in some cases, no display is provided in the system). At 250, the system operates to determine if a start instruction has been received, such as via start switch 140. If not, the method 200 continues at 250 with waiting for instructions (or optionally, after the timer 134 determines a preset delay period has passed, the step 250 is completed with a positive response to continue operation 200 automatically). When a start instruction is received at 250, the method 200 continues at 260 with the operation manager 138 starting or running the shredder 160. At 270, the user inputs documents and/or media into the feed chute 150 and the shredder 160 receives the documents/media via inlet 162. At 274, the shredding apparatus 164 acts to shred the documents/media and outputs the resulting material to storage bin 170, which has viewing window or portal 174 allowing concurrent visual confirmation of document/media destruction.

At 280, the method 200 continues with determining whether a stop instruction is received from a user operating a stop switch 142 (or by the operation manager 138 identifying a reason for timing out operation or halting operation, such as due to failure of the shredder 160 or the like) or the end of the shredding time (i.e., a time out) as indicated by the timer 134. If not, the timer 134 is used by the operation manager 138 at 282 to update the remaining or available shredding time on display 146 at step 282 and the method 200 then continues with repeating steps 260, 270, 274, and 280. If a stop is received or the shedding time runs out at 280, the method 200 optionally includes storing usage information and/or billing data 129 for use in later billing or invoicing a user that enters an activation code as a form of payment (or, in some cases, enters a credit/debit card that is billed for amount of usage rather than on a specific preset shredding period). The method 200 then ends at 290.

Figure 3:
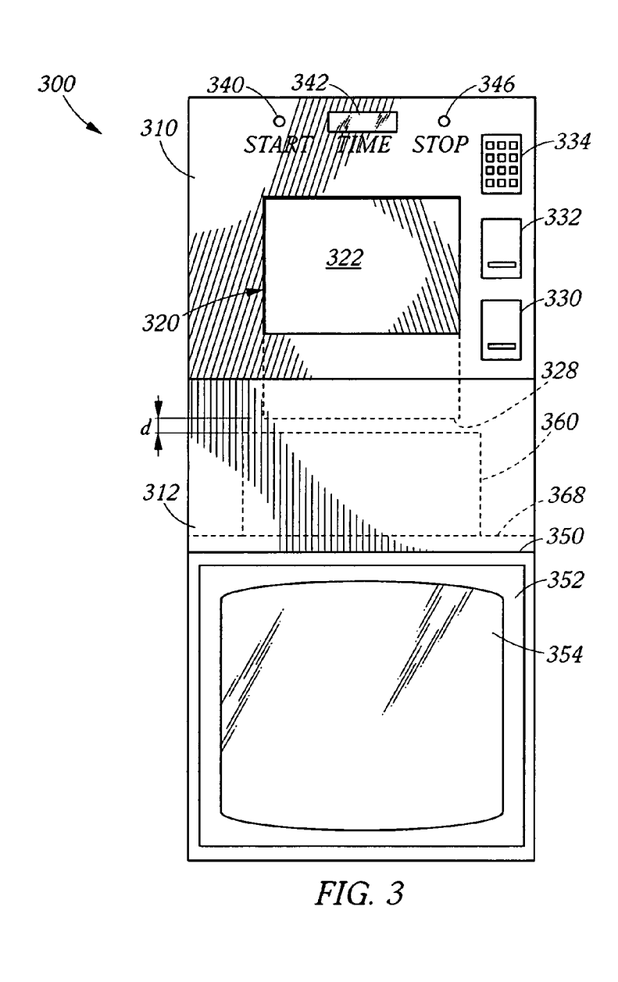
FIG. 3 shows a front view of an exemplary physical implementation of a pay-per-use shredding system, such as the system shown in block form in FIG. 1.
Figure 4:
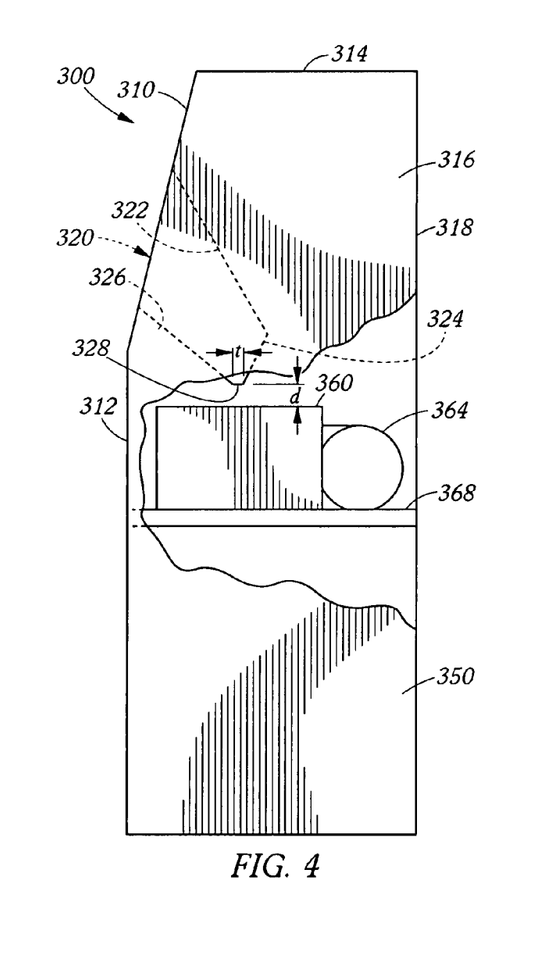
FIG. 4 is a side view of the shredding system of FIG. 3.

FIGS. 3 and 4 illustrate a front and side view of one physical embodiment of a shredding system 300 according to the present invention. As shown, the shredding system 300 includes a cabinet or housing that includes a sloped, upper front panel 310, a substantially vertical, lower front panel 312, top panel 314, side panels 316, and back panel 318. The housing also includes a feed chute 320 that is made up of a top wall 322 and a bottom wall 326 that are spaced apart and direct materials to a rear wall 324. The system 300 is configured with built in safety checks, and in this regard, the rear wall 324 and bottom wall 326 together form a feed chute outlet 328 with a thickness, t, that is selected to be small enough to allow media and documents to pass but to block fingers and other parts from passing, e.g. the walls 324, 326 may only be spaced apart 0.375 to 0.25 inch or less. Safety is further provided by spacing apart the outlet 328 from the shredder 360 or shredder inlet by a depth, d, that is great enough when combined with the limited thickness or size, t, of the opening 328 such that it is physically improbable that a finger or other body part could pass through the opening 328 and reach the shredder 360. For example, the depth, d, may be at least about 3 inches when the thickness, t, is less than about 0.5 inches.

The system 300 also includes a storage bin 350 for storing the output from shredder 360. A visual confirmation portal or window 354 is provided in an access door or panel 352 to allow users to visually see or witness the destruction of their material as it is output from the shredder into the storage bin 350. The cabinet includes a shelf 368 upon which the shredder 360 and its motor or driver 364 is positioned between the feed chute 320 and the storage bin 350. The shredder 360 may take a number of forms and have a variety of capacities to practice the invention. In one embodiment, the shredder 360 is a cross-cut shredder (e.g., a Security Level 3 shredder) that can shred paper documents and also plastic and other media such as credit cards, CDs, DVDS, and the like and can handle staples and paper clips and the like without jamming or being damaged.

The system 300 further includes (as discussed with reference to FIGS. 1 and 2) a bill/coin receptor 330, a credit/debit/bank card receptor 332 (receptors 330, 332 are mounted on a secure access drawer, which is accessed from the front), and an activation code input keypad 334. In some embodiments, all three payment receipt devices are provided (as shown) while in other one or two of these devices 330, 332, and 334 are provided (in any combination). Yet further, a start button 340 is provided to allow a user to begin a shredding session after payment is accepted and/or validated. A time display 342 is provided in the cabinet panel 310 for displaying the available or remaining time in the current or present shredding time period, and preferably, such a display is updated on an ongoing basis to show the time (such as minutes and seconds) left for performing shredding of user's materials. A stop button 346 is also provided on the front panel 310 to allow a user to stop the shredder 360, such as when they have input all their materials. A proximity sensor, not shown, may be included to sense when the operator is present and the system 300 may be designed such that if they leave without pressing the stop button 346 (such as after a preset delay) automatically terminating the session.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. An apparatus for shredding material for use in public facilities on a pay-per-use basis, comprising:
    a shredder, with an inlet and an outlet, shredding material fed into the shredder inlet;
    a feed chute positioned proximate to the shredder, wherein the feed chute comprises an outlet spaced apart from the shredder inlet by at least about 3 inches and having a maximum thickness of less than about 0.5 inches, whereby the shredder is safely operable in the public facilities;
    a controller selectively operating the shredder; and
    a payment receipt mechanism receiving a payment from a user;
    wherein the controller determines validity of the received payment and when validated, operates the shredder and wherein the controller comprises a shred period calculator converting the received payment to a shred time period.

2. The apparatus of claim 1, further comprising a storage bin positioned to receive the material fed into and shredded by the shredder output from the shredder outlet in an inner compartment, wherein the storage bin comprises a portal of substantially transparent material with a line of sight to the inner compartment from a location exterior to the storage bin visually exposing at least a portion of the inner compartment of the storage bin.

3. The apparatus of claim 1, the controller comprising a payment validator performing the validating of the received payment, wherein the payment receipt mechanism comprises a device for receiving an activation code and the payment validator operates to compare an activation code in the received payment with a controller-accessible payment code and wherein the controller further stores usage time for use in later invoicing a user associated with the activation code.

4. The apparatus of claim 1, further comprising a display device and wherein the controller operates to display the shred time period on the display device.

5. The apparatus of claim 4, further comprising a timer operating to at least periodically determine a remaining amount of shred time period after the operating of the shredder is begun by the controller.

6. The apparatus of claim 5, operating the controller to halt the operating of the shredder when the shred time period expires.

7. A public-access shredding system, comprising:
a cabinet with a front panel and an internal shelf;
a feed chute in the front panel with an opening for receiving material for shredding;
a storage bin formed in a lower portion of the cabinet, the storage bin comprising a visual confirmation window of substantially transparent material providing a visual path through the front panel of the cabinet to the storage bin;
a shredder disposed between the feed chute and the storage bin;
a control board in the cabinet, the control board comprising a processor and logic operating to run the shredder for a timed shredding session in response to receipt of a payment;
a display on the front panel of the cabinet;
a timer measuring a length of time of the running of the shredder;
logic for determining an available shredding time by reducing the timed shredding session by the running length of time for the shredder; and
logic for operating the display to show the available shredding time or for displaying the length of time of the running of the shredder.

8. The system of claim 7, further comprising a payment receipt mechanism receiving the payment as an input credit, debit, or bank card, as inserted currency, or as an input activation code.

9. The system of claim 8, wherein the logic of the control board functions to validate the payment and to determine a length of time for the timed shredding session based on a determined value of the payment.

10. The system of claim 7, wherein the feed chute comprises an outlet spaced apart from the shredder by at least about 3 inches and having a maximum thickness of less than about 0.5 inches.

11. An apparatus for shredding material for use in public facilities on a pay-per-use basis, comprising:
a shredder, with an inlet and an outlet, shredding material fed into the shredder inlet;
a controller selectively operating the shredder;
a payment receipt mechanism receiving a payment from a user, the controller comprising a shred period calculator converting the received payment to a shred time period;
a storage bin positioned to receive in an inner compartment the material fed into and shredded by the shredder output from the shredder outlet, wherein the storage bin comprises a portal of substantially transparent material with a line of sight to the inner compartment from a location exterior to the storage bin visually exposing at least a portion of the inner compartment of the storage bin;
wherein the controller determines validity of the received payment and when validated, operates the shredder for the shred time period.

12. The apparatus of claim 11, the controller comprising a payment validator performing the validating of the received payment, wherein the payment receipt mechanism comprises a device for receiving an activation code and the payment validator operates to compare an activation code in the received payment with a payment code.

13. The apparatus of claim 11, further comprising a display device and wherein the controller operates to display the shred time period on the display device.

14. The apparatus of claim 13, further comprising a timer operating to at least periodically determine a remaining amount of shred time period after the operating of the shredder is begun by the controller.

15. The apparatus of claim 11, further comprising a feed chute positioned proximate to the shredder, wherein the feed chute comprises an outlet spaced apart from the shredder inlet by at least about 3 inches and having a maximum thickness of less than about 0.5 inches.

16. An apparatus for shredding material for use in public facilities on a pay-per-use basis, comprising:
a shredder, with an inlet and an outlet, shredding material fed into the shredder inlet;
a feed chute positioned proximate to the shredder, wherein the feed chute comprises an outlet spaced apart from the shredder inlet by at least about 3 inches and having a maximum thickness of less than about 0.5 inches, whereby the shredder is safely operable in the public facilities;
a controller selectively operating the shredder; and
a payment receipt mechanism receiving a payment from a user;
wherein the controller determines validity of the received payment and when validated, operating the shredder, and
wherein the controller comprises a payment validator performing the validating of the received payment, wherein the payment receipt mechanism comprises a device for receiving an activation code and the payment validator operates to compare an activation code in the received payment with a controller-accessible payment code and wherein the controller further stores usage time for use in later invoicing a user associated with the activation code.

* * * * *

(12) EX PARTE REEXAMINATION CERTIFICATE (7371st)
United States Patent
Podrovitz (10) Number: US 7,213,777 C1
(45) Certificate Issued: Feb. 16, 2010

(54) PUBLIC ACCESS INFORMATION DESTRUCTION SYSTEM PERFORMING PAY-PER-USE SHREDDING

(75) Inventor: Johnny R. Podrovitz, Colorado Springs, CO (US)

(73) Assignee: JRP Enterprises, LLC, Colorado Springs, CO (US)

Reexamination Request:
No. 90/010,072, Feb. 4, 2008

Reexamination Certificate for:
Patent No.: 7,213,777
Issued: May 8, 2007
Appl. No.: 11/185,266
Filed: Jul. 20, 2005

Related U.S. Application Data

(60) Provisional application No. 60/653,316, filed on Feb. 16, 2005.

(51) Int. Cl.
*B02C 23/00* (2006.01)
*B02C 1/08* (2006.01)
*B02B 5/02* (2006.01)

(52) U.S. Cl. .................. 241/37.5; 241/100; 241/236
(58) Field of Classification Search .................. None
See application file for complete search history.

(56) References Cited

PUBLICATIONS

Lee et al. Dec. 2004. Finger Injuries Associated with Home Document (Paper) Shredding Machines. US Consumer Product Safety Commision, Directorate for Enginerrring Sciences, CPSC–ES–0501, 8 pages.*
http://web.archive.org/web/20050412 of www.ushred.com (Mar. 4, 2005 version of www.ushred.com/how_it_works.shtml).*
www.ushred.com; © 2005, Watsonville, California.
http://fandebusinessmachines.com/fephila/int1490s.html; Dec. 4, 2007, pp. 1–3.

* cited by examiner

*Primary Examiner*—Jeffrey L. Gellner (57) ABSTRACT

A pay-per-use shredding system for public use for destroying documents and media containing private or personal information. The system includes a shredder, a feed chute for receiving material and an outlet feeding the material to the shredder inlet, and a storage bin below the shredder outlet to receive shredded materials. A portal provides a line of sight to the interior of the storage bin for user visual confirmation of destruction. The system further includes a payment receipt mechanism, such as a keypad, a card receptor, or a bill or coin receptor. A controller acts to validate and/or authenticate payment at the receipt mechanism and to determine a shred time period. The controller operates the shredder for the shred time period, such as in response to a start instruction from the user via a start button. A display is decremented to show the remaining shred time to the user.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–16 is confirmed.

* * * * *